United States Patent [19]

Sakagami et al.

[11] 3,915,691

[45] Oct. 28, 1975

[54] METHOD AND APPARATUS OF TREATING INDUSTRIAL WASTE LIQUID

[75] Inventors: Toyoharu Sakagami, Takatsuki; Susumu Kakumoto, Nagaoka; Katsuhei Okawa, Suita; Kazuto Miyashita, Takatsuki, all of Japan

[73] Assignee: Matsushita Electric Industrial Company, Ltd., Kadoma, Japan

[22] Filed: Feb. 27, 1973

[21] Appl. No.: 336,349

[30] Foreign Application Priority Data

Mar. 2, 1972  Japan.............................. 47-22031

[52] U.S. Cl.................... 75/.5 R; 75/44 S; 264/216
[51] Int. Cl.²............................................ B29D 7/02
[58] Field of Search........ 75/.5 R, 44 S, 111; 264/4, 264/216, 349; 117/16, 22, 26–28, 160 R; 248/23

[56] References Cited
UNITED STATES PATENTS

| | | |
|---|---|---|
| 3,164,645 | 5/1965 | DeVries.............................. 264/216 |
| 3,395,203 | 7/1968 | Morita................................ 264/216 |
| 3,577,508 | 5/1971 | Desaulniers........................ 264/216 |
| 3,762,454 | 10/1973 | Wilkins................................ 117/16 |
| 3,780,195 | 12/1973 | Balassa.................................. 264/4 |
| 3,788,955 | 1/1974 | Crites..................................... 264/4 |

*Primary Examiner*—Peter D. Rosenberg
*Attorney, Agent, or Firm*—Wenderoth, Lind & Ponack

[57] ABSTRACT

A method of treating an industrial waste liquid containing powder of metals such as cadmium or yttrium and/or their compounds comprising the steps of:

mixing said waste liquid with a liquid containing water-soluble high molecular compound such as polyvinyl alcohol, evaporating water in said mixture by heating with hot blast for concentration, and cooling said dehydrated mixture to form solid film of said high molecular compound enclosing said waste metals and/or their compounds.

4 Claims, 1 Drawing Figure

U.S. Patent    Oct. 28, 1975    3,915,691
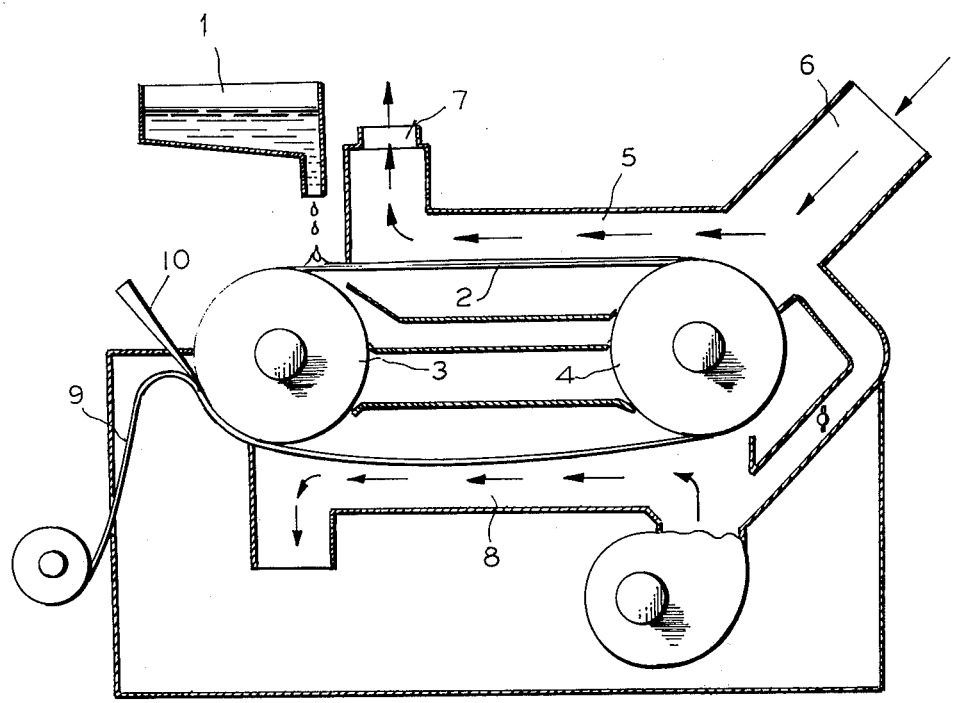

METHOD AND APPARATUS OF TREATING INDUSTRIAL WASTE LIQUID

BACKGROUND OF THE INVENTION

This invention relates to a treatment of industrial waste liquid containing metals, especially such noxious substances as heavy metals and/or their compounds, and offers a method and a relevant apparatus to easily reclaim such noxious substances.

In case such metal elements contained in an industrial waste liquid are noxious, such waste liquid is concerned as a source of pollution of sewer and soil. Nevertheless, any satisfactory formulae of treating such industrial waste liquid can hardly be found. In case, for instance, industrial waste liquid contains such heavy metals as zinc, cadmium, manganese, lead and/or chromium, these heavy metals can be eliminated and reclaimed by transforming them into insoluble salts through the chemical reaction principle.

In such formulae, however, the chemical reaction is often liable to produce noxious by-products which, even after disposing treatment, are possible to produce salts unreclaimed or heavy metals not reacted or added bases unchanged.

Moreover, those heavy metals contained in waste liquid, either as simple substances or as compounds, are mostly in powder and suspended states, and hence, are difficult to be completely eliminated even by means of precipitation or centrifugal reclamation.

SUMMARY OF THE INVENTION

The present invention purports to provide an effective solution to the abovementioned problem in the treatment of industrial waste liquid.

BRIEF EXPLANATION OF THE DRAWING

The drawing is a schematic sideview of the apparatus according to the present invention.

DETAILED DISCLOSURE OF THE INVENTION

As an example thereof, a treatment of waste liquid containing heavy metals and/or their compounds left in during the process of manufacturing color cathode ray tubes will be explained in detail as follows.

On the inner surface of the face panel of the color cathode ray tube, phosphors emitting red, green and blue lights, respectively, are securely arranged alternately in a specified dots pattern. These phosphor dots are excited by electron beams and produce color pictures.

For application of said phosphor dots to the face plate, usually the so-called photochemical dot-forming method is employed. That is, this dot-forming method is first to coat the face panel with a slurry made by diffusing phosphor powder in a photosensitive film-forming material containing polyvinyl alcohol and bichromate, and after a photosensitive film has been formed on the face panel, then to expose the film in a specified dotted pattern through a multi-holed plate called a shadow-mask, and finally to develop the film by showering it with hot water to complete phosphor dots.

During this process, large quantities of waste liquid of slurry, as well as of those of materials unexposed when developing, are produced. For the phosphor, a compound of rare earth elements such as zinc sulfide (ZnS), cadmium sulfide (CdS), yttrium oxide ($Y_2O_3$), yttrium oxysulfide ($Y_2O_2S$), etc. are used. These phosphors, when absorbed into human or animal bodies or into agricultural or dairy products, are almost invariably noxious.

The following is the procedure of reclaiming such noxious phosphors from the abovementioned waste liquid by embodying an apparatus shown in the drawing.

First, drip the waste liquid from a container 1 onto a metal belt 2 while rotating it with driving drums 3 and 4, and leading it into a hot blast stove 5.

The hot blast stove 5 is designed to blow a hot blast of, for instance, 200°C from its blast intake 6 and to exhaust it away from an exhaust hole 7. In this stove, water in said waste liquid is evaporated and the polyvinyl alcohol solution is concentrated.

In the abovementioned stage, all the phosphor contents of the waste liquid are deposited in the concentrated polyvinyl alcohol solution. Therefore, as the next step, the metal belt 2 passes through a cold chamber 8, where the metal belt 2 is gradually cooled and finally, a thin film 9 of the polyvinyl alcohol formed on the metal belt 2 is peeled off by a peeling blade 10 and rolled up, thus reclaiming all residual substances in the waste liquid.

The design of the hot blast stove 5 in this apparatus depends on the quantity of waste liquid to be treated and the concentration of high molecular compound. In case of treating a waste liquid of slurry prepared with a water solution of polyvinyl alcohol in the concentration of, for instance, 2–10 percent in the abovementioned example of manufacturing color cathode tubes, an operation with the hot blast at about 200°C, running speed of the metal belt 2 at 300mm per minute, and drying surface area of the metal belt 2 at about 0.75 $m^2$, is estimated to output a treating capacity of about 12 litres per hour.

An appropriate temperature for the hot blast stove is between 100°C and 300°C. By this method, all the metals and/or their compounds contained in the waste liquid can be almost completely reclaimed in concentrated solid substances.

In case a waste liquid containing metals does not include water-soluble high-molecular compounds or include that of low concentration, reclamation of metal contents can be made by adding a water-soluble high-molecular compound to such waste liquid as mentioned above, then by concentrating said waste liquid with hot blast to contain such metals in said concentrated solution of high molecular compound, and finally by cooling to form the film of high molecular compound.

Besides, said polyvinyl alcohol, as a water-soluble high-molecular compound, such compounds as methyl cellulose, carboxy methyl cellulose, sodium alginate and sodium cellulose xanthogenate can be used to obtain the equal effect.

This invention features combination of the concentration by heating and enclosing the metals and/or their compound in the high-molecular compound film. This feature enables very easy handling, storing or carrying.

Reclaiming the metals from the concentrated compound can be made by burning the organic compound to leave the metals as residue, for instance, oxide or sulfide of metals.

In the method of this invention, the treatment process produces no by-products except water vapors. Therefore, there is no risk of salts or unreacted metals and added bases being dissolved and coming out, unlike the conventional method of separation and reclamation utilizing chemical reactions, for instance, precipitation.

Also in the method of this invention utilizing the addition of water-soluble high-molecular compound into waste liquid, the noxious substances, for instance, all of metal compounds, salts, ions, etc. which usually do not evaporate or sublimate in the drying, can be reclaimed in a solid state film by enclosing them in a high-molecular compound.

Consequently, transportation and handling of such residues are quite safe and easy. Furthermore, the heating of the dryer can be made by utilizing the waste heat of other heating system, for instance, of a chemical reaction furnace. In summing the above merits up, this invention offers diverse utilizations as a treatment of industrial waste.

What is claimed is:

1. A method of treating an industrial waste liquid containing a metallic powder selected from the group consisting of powders of metals, metallic compounds and mixtures thereof which comprises:
   1. mixing an aqueous waste liquid containing metallic powders selected from the group consisting of powders of metals, metallic compounds and mixtures thereof with a water-soluble high molecular weight compound selected from the group consisting of polyvinyl alcohol, methyl cellulose, carboxy methyl cellulose, sodium alginate and sodium cellulose xanthogenate to form a liquid mixture;
   2. transferring the liquid mixture onto a movable belt to spread it over the surface of the belt;
   3. subjecting the liquid mixture to temperatures between 100°C and 300°C to evaporate the water in the liquid and to concentrate the mixture;
   4. cooling the concentrated mixture to form a solid film of the high molecular weight film-forming organic compound, which film contains the said metallic powders embedded in the solidified organic high molecular weight film.

2. A method of treating an industrial aqueous waste liquid mixture containing metallic powders selected from the group consisting of powders of waste metals, metallic compounds and mixtures thereof in admixture with a film-forming, high molecular weight water-soluble organic compound selected from the group consisting of polyvinyl alcohol, methyl cellulose, carboxy methyl cellulose, sodium alginate and sodium cellulose xanthogenate which comprises:
   1. transferring the said industrial aqueous waste liquid mixture containing metallic powders and said film-forming high molecular weight water-soluble organic mixture onto a movable belt to spread it over the surface of the belt;
   2. subjecting the liquid mixture to a temperature between 100°C and 300°C to evaporate the water in the liquid and concentrate the mixture, and
   3. cooling the concentrated mixture to form a solid film of the high molecular weight film-forming organic compound, which contains the metallic powders embedded in the solidified organic high molecular weight film.

3. A method according to claim 1 wherein the aqueous waste liquid mixture is concentrated and cooled to form the solid film by first moving the belt containing the aqueous waste liquid mixture thereupon into a hot zone to evaporate the water and concentrate the mixture and then into a cool zone to form the solid organic high molecular weight film containing the waste metals, metallic compounds or mixtures thereof embedded therein.

4. A method according to claim 1 wherein the waste industrial liquid is that produced as a by-product of the photochemical dot-forming process applied in the manufacture of color cathode ray tubes and the waste liquid contains metal compounds selected from the group consisting of zinc sulfide, cadmium sulfide, yttrium oxide and yttrium oxysulfide.

* * * * *